Patented July 31, 1923.

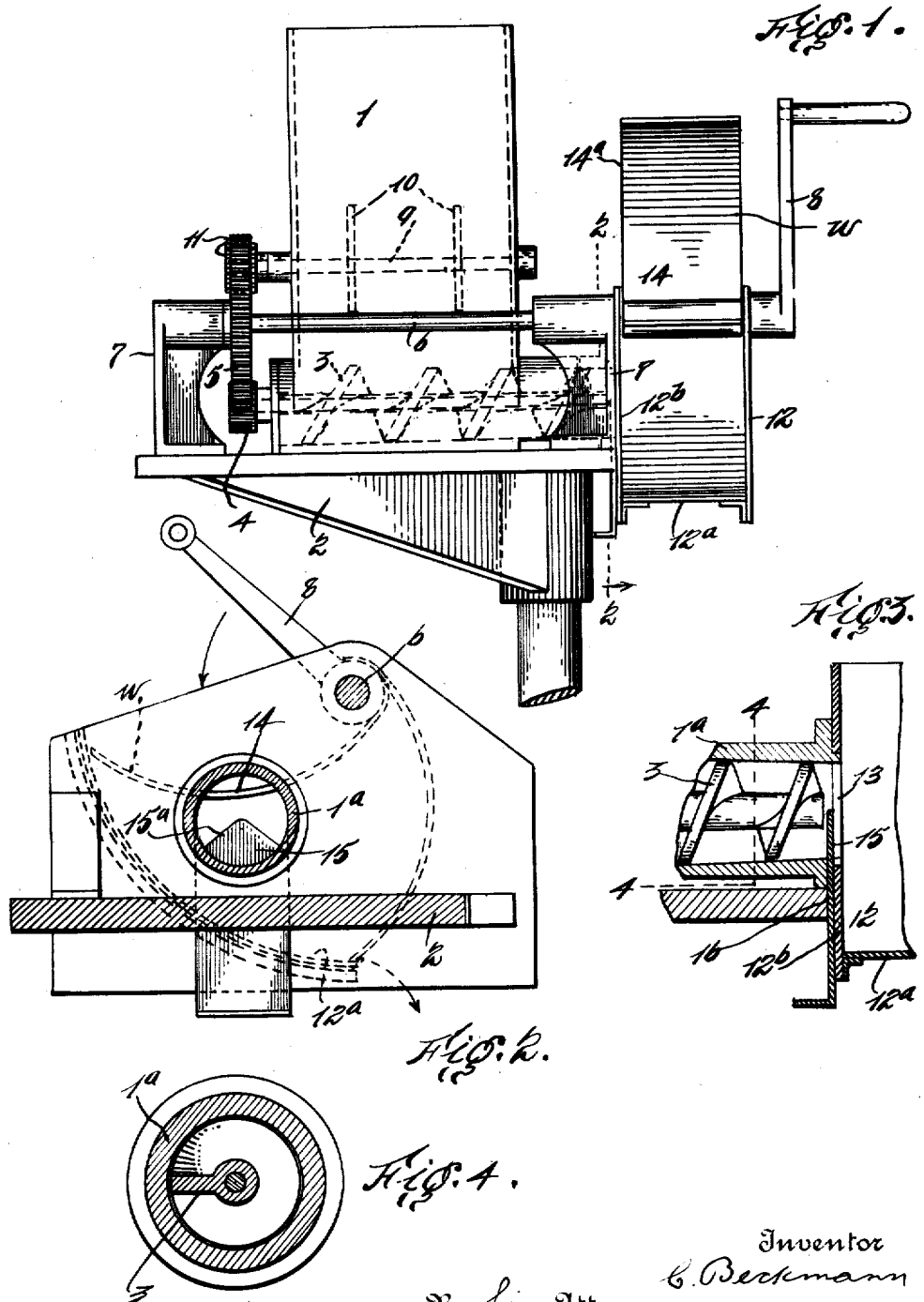

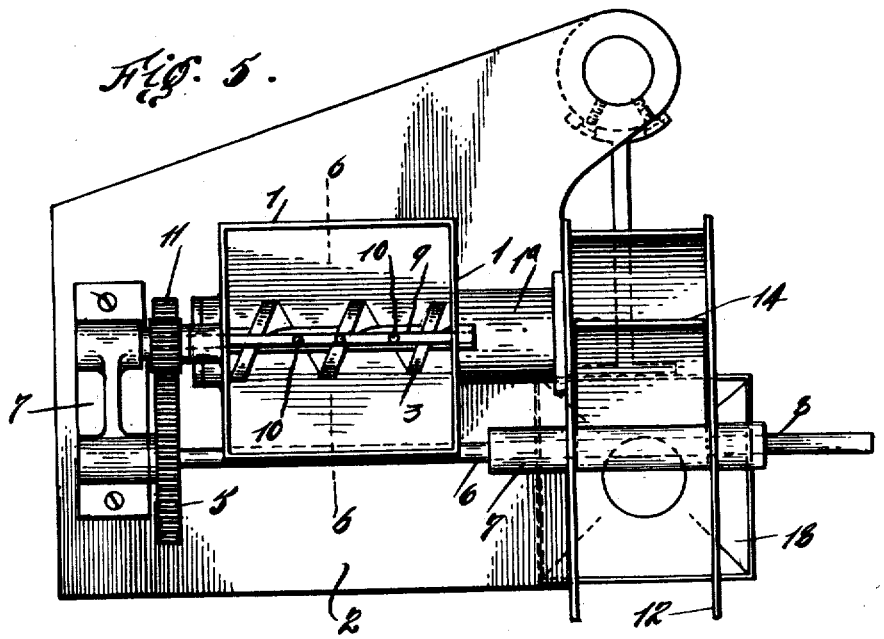
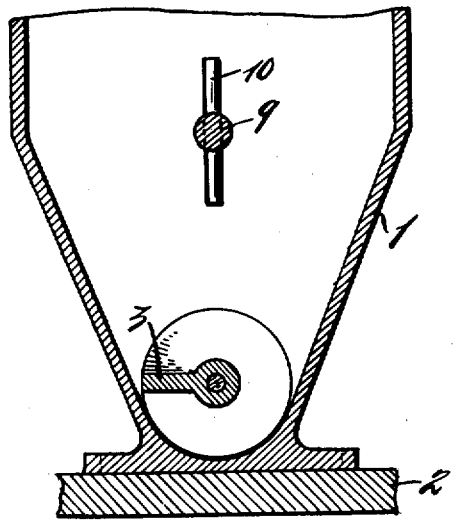
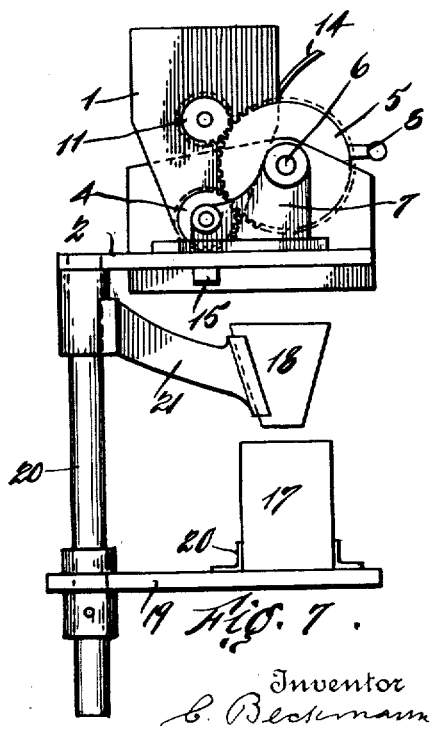

1,463,457

UNITED STATES PATENT OFFICE.

CARL BECKMANN, OF NEW YORK, N. Y., ASSIGNOR TO E. D. ANDERSON, INC., OF NEW YORK, N. Y., A CORPORATION OF NEW YORK.

FEED REGULATOR.

Application filed July 30, 1920. Serial No. 400,055.

*To all whom it may concern:*

Be it known that I, CARL BECKMANN, a subject of Germany, and resident of New York city, in the county of Queens and State of New York, have invented certain new and useful Improvements in Feed Regulators, of which the following is a specification.

The object of my invention is to provide means for forming definite charges of goods to be deposited in receptacles, such as cartons, bags and the like, in a successive manner, the several charges being formed from the material in bulk.

In carrying out my invention I provide means to continuously feed material from a hopper or container into a guideway wherein a rotative cutter operates to separate from the moving material definite charges successively and to cause said charges to be delivered from the guideway.

My invention also comprises novel details of improvement that will be more fully hereinafter set forth and then pointed out in the claims.

Reference is to be had to the accompanying drawings forming part hereof, wherein Figure 1 is a side view of a machine embodying my invention; Fig. 2 is a section substantially on the line 2, 2 in Fig. 1; Fig. 3 is a detail section; Fig. 4 is a section on the line 4, 4 in Fig. 3; Fig. 5 is a plan view; Fig. 6 is an enlarged section on the line 6, 6 of Fig. 5 and Fig. 7 is a side elevation of the machine.

Similar numerals of reference indicate corresponding parts in the several views.

A hopper or receiver 1 is adapted to receive the material in bulk and the same is shown mounted upon a bracket 2 which may be supported in any suitable manner. From the bottom of the hopper a tubular outlet 1ª extends and within the said hopper and outlet is a worm 3 to feed material from the hopper. A gear 4 connected with the shaft of the worm may be driven in any suitable manner, such as by an intermeshing drive gear 5 carried by a shaft 6 journaled in suitable bearings, as in brackets 7 supported by bracket 2, which shaft may be rotated in any desired manner either manually by a crank 8 or by power, as with belt and pulley. In order to keep the material in hopper 1 stirred or agitated during operation of the machine I extend a shaft 9 through the hopper above the worm and apply any desired number of stirring fingers or projections 10 on the shaft. Said shaft is shown provided with a gear 11 in mesh with gear 5, whereby as the worm is rotated the stirrers also will be rotated.

At the delivery end of the outlet 1ª a receiving guideway is provided, indicated at 12, and in communication with said guideway is an opening 13 in the side wall 12ᵇ of said guideway (Fig. 3). The bottom 12ª of the guideway is curved substantially on an arc described around shaft 6, which shaft carries a cutting and delivery blade 14, the free end of which is adapted to sweep close to or in contact with the inner surface of bottom 12ª of guideway 12 and an edge 14ª of said cutter is adapted to sweep along the side wall 12ᵇ of the guideway to cut off material fed through opening 13 by the worm.

In order to control the amount of material delivered through opening 13 by the operation of worm 3 I provide a gate or valve 15 guided in a guideway indicated at 16 in Fig. 3, whereby said gate may be adjusted transversely with respect to guide 1ª and opening 13. The operative end of gate or valve 15 may be tapered or reduced as indicated at 15ª, Fig. 2.

Below the delivery guideway 12 a receptacle 17 may be placed to receive the charges of material cut off and delivered by blade 14. A chute or funnel 18 may be placed between guideway 12 and the receptacle 17 to guide the charges of material from the guideway to the receptacle. The receptacle may be placed in position to receive the charges of material in any suitable manner, such as by automatic machinery well known in the art, or by hand. As a simple illustration I have shown a bracket 19 having a receiver 20 into which the receptacle may be placed, which bracket is shown supported by a post 20, which may also support bracket 2. An arm 21 projecting from the post 20 supports funnel 18.

The material may be fed into hopper 1 in bulk and shaft 6 will be rotated to cause rotation of worm 3, stirrers 10 and blade 14, the ratio of gearing between shaft 6 and the worm being such that for each rotation of blade 14 a definite amount of the material will be fed by the worm from guide 1ª for each charge. The blade 14 is of such width as to fit fairly snugly within guideway 12 between the side walls of the latter. When the blade cuts off material that has passed through opening 13 into said guideway said blade will sweep the charge so cut off from the guideway and cause it to drop below to the receptacle thereunder, the same operation occuring each time the blade makes a complete rotation through the guideway. After a receptacle has been charged a new receptacle will be placed below guideway 12 to receive the successive charge cut off and delivered by blade 14, and so on successively.

My improvements are adapted to measure and deliver definite charges of material from a continuously moving supply of the same, since the feeding operation of the worm and the charge cutting off operation of blade 14 bear a definite relation. My invention is particularly adapted to form charges from sticky and gummy substances, such as pastes, which charges are swept by blade 14 from the guideway each time said blade is rotated a complete rotation.

Changes may be made in the details of construction set forth, within the scope of appended claims, without departing from the spirit of my invention.

Having now described my invention, what I claim is:

1. The combination of a hopper having an axially disposed delivery outlet, a worm axially disposed with relation to said outlet to deliver material from the hopper through the outlet, a receiving guideway having a side opening communicating with the outlet and disposed in the axis of the worm to receive material therefrom, a blade rotative in the guideway and disposed parallel with the axis of the worm and having an edge operative across said side opening adapted to cut charges of material as delivered by said worm in the guideway, said blade having an outer edge operative along a wall of the guideway to push the material from the guideway, and gearing connecting the worm and the blade for rotating them in unison.

2. The combination of a hopper having an axially disposed delivery outlet, a worm axially disposed with relation to said outlet to deliver material from the hopper through the outlet, a receiving guideway having a side opening communicating with the outlet and disposed in the axis of the worm to receive material therefrom, a blade rotative in the guideway and disposed parallel with the axis of the worm and having an edge operative across said side opening adapted to cut charges of material as delivered by said worm in the guideway, said blade having an outer edge operative along a wall of the guideway to push the material from the guideway, stirring fingers in said hopper, a shaft carrying said fingers, a shaft carrying said blade, and gearing between said worm and shafts for operating them uniformly.

3. The combination of a hopper having a delivery outlet, means to feed material from said outlet, a guideway or chute to receive said material and deliver the severed material therefrom, a blade operative in said guideway to cut off charges of material from said outlet and deliver the same from the guideway and a gate mounted to be moved across the outlet to control the quantity of material flowing therethrough.

Signed at New York in the county of Queens and State of New York this 24th day of July A. D. 1920.

CARL BECKMANN.